(12) United States Patent
Bureau et al.

(10) Patent No.: US 10,550,987 B2
(45) Date of Patent: Feb. 4, 2020

(54) SEISMIC REINFORCED UNDERGROUND WATER CONDUIT

(71) Applicant: Sanexen Enviromental Services, Inc., Brossard (CA)

(72) Inventors: Martin Bureau, Montreal (CA); Gilles Gagnon, Repentigny (CA); Michael Davison, Brossard (CA); Benoit Cote, Otterburn Park (CA)

(73) Assignee: SANEXEN ENVIRONMENTAL SERVICES INC. (CA)

( * ) Notice: Subject to any disclaimer, the term of this patent is extended or adjusted under 35 U.S.C. 154(b) by 263 days.

(21) Appl. No.: 14/741,531

(22) Filed: Jun. 17, 2015

(65) Prior Publication Data

US 2015/0285423 A1 Oct. 8, 2015

Related U.S. Application Data

(63) Continuation-in-part of application No. 13/903,122, filed on May 28, 2013, now abandoned.

(51) Int. Cl.
*F16L 55/165* (2006.01)
*D03D 3/02* (2006.01)
(Continued)

(52) U.S. Cl.
CPC ............ *F16L 55/1656* (2013.01); *D03D 3/02* (2013.01); *D03D 15/0011* (2013.01);
(Continued)

(58) Field of Classification Search
CPC . F16L 55/1656; F16L 55/179; F16L 55/1653; F16L 55/1651; F16L 57/02;
(Continued)

(56) References Cited

U.S. PATENT DOCUMENTS 4,239,063 A * 12/1980 Long .................... F01N 13/102
138/123
4,681,783 A * 7/1987 Hyodo ................ F16L 55/1656
138/124
(Continued)

FOREIGN PATENT DOCUMENTS

| JP | S59225921 A | 12/1984 |
|---|---|---|
| JP | H0857957 A | 3/1996 |
| JP | 2015063093 A | 4/2015 |

OTHER PUBLICATIONS

Search Report for corresponding United Kingdom Patent Application No. 1610593.4, dated Dec. 12, 2016.
International Search Report and Written Opinion for corresponding International Application No. PCT/IB2014/001804 dated Dec. 4, 2014.

*Primary Examiner* — Camie S Thompson
(74) *Attorney, Agent, or Firm* — Lavery, De Billy, LLP; Gwendoline Bruneau

(57) ABSTRACT

A structural liner for reinforcing existing underground water conduits to resist earthquakes and landslides adapted for insertion into underground water conduits without having to excavate are disclosed. The reinforcement structural device consists of a seamless woven tubular sheath impregnated with a hardening resin which is adapted for insertion into a network of underground water conduits without the need to excavate. The seamless woven tubular sheath consists of continuous longitudinal fiber warp yarn providing tensile strength along the longitudinal axis of the woven tubular sheath and circumferential fiber filling yarn providing tensile strength around the wall of the woven tubular sheath.

8 Claims, 8 Drawing Sheets

(51) Int. Cl.
*F16L 55/179* (2006.01)
*D03D 15/00* (2006.01)
*F16L 57/02* (2006.01)

(52) U.S. Cl.
CPC ....... *F16L 55/1651* (2013.01); *F16L 55/1653* (2013.01); *F16L 55/179* (2013.01); *F16L 57/02* (2013.01); *D10B 2505/02* (2013.01)

(58) Field of Classification Search
CPC ...... D03D 3/02; D03D 15/00; D03D 15/0011; D10B 2502/02; D10B 2401/062; D10B 2401/63; B32B 1/08; B32B 27/00; B32B 27/12; Y10T 428/1362; Y10T 428/24744; E03F 2003/065; E03F 7/12; B29L 2033/006
USPC .......... 138/97, 124; 405/184.2, 150.1, 184.1, 405/154.1, 184.3; 139/287 R, 387 R; 428/36.1, 188
See application file for complete search history.

(56) References Cited

U.S. PATENT DOCUMENTS

| | | | |
|---|---|---|---|
| 4,836,715 A | 6/1989 | Wood | |
| 5,077,107 A | 12/1991 | Kaneda et al. | |
| 6,129,119 A | 10/2000 | Schwert et al. | |
| 6,779,563 B2 | 8/2004 | Schwert et al. | |
| 7,717,648 B2 | 5/2010 | Kanao | |
| 2002/0148400 A1* | 10/2002 | Eagles | B63B 35/285 114/256 |
| 2014/0311607 A1 | 10/2014 | Mathey et al. | |
| 2014/0356074 A1 | 12/2014 | Bureau et al. | |
| 2015/0192223 A1* | 7/2015 | Walters | B29C 63/34 405/184.2 |
| 2016/0032082 A1* | 2/2016 | Matsumoto | D06M 15/53 442/197 |

* cited by examiner

SEISMIC REINFORCED UNDERGROUND WATER CONDUIT

CROSS-REFERENCE

This application is a continuation-in-part and claims the benefit under 35 U.S.C. § 120 of U.S. application Ser. No. 13/903,122, filed May 28, 2013, the entire contents of which are incorporated herein by reference.

FIELD OF THE INVENTION

The present invention relates to a method of reinforcing an underground water conduit to resist earthquakes and landslides and to a structural reinforcement device adapted for insertion into an underground water conduit.

BACKGROUND OF THE INVENTION

Underground water conduits, either potable water pipes, waste water pipes or sewer pipes, are typically made of rigid materials such as reinforced concrete, cast iron, ductile iron, steel and hard polymers such as PVC, HDPE, etc. that are durable and adapted to resist high internal pressure if required and the weight of the landfill covering them. Underground water pipes provide essential services to the urban population, and as a result of their geographical dispersion they remain particularly vulnerable to damage caused by natural disasters. A network of buried water pipes connected together extends over long distances, spreads out in all directions to provide services to residential home or businesses over a wide area and may pass through soils having different properties.

In the event of an earthquake or a landslide, the network of water pipes is subjected to variable ground motions along its various segments and particularly at its various connections for which it may not have been designed to resist. For example, at bends, elbow or tee connections, seismic waves propagating in a certain direction or landslides moving in a certain direction, affect the water pipes before and after bends, elbow or tee connections differently. Previous major earthquakes revealed that most damage of the buried segmented water pipes occurs at the joints and connections of the network of water pipes. It has been proven that the differential motions between the pipe segments are one of the primary reasons that results in damages and ruptures. With the surrounding soil giving way, the external forces exerted on the water pipe network around bends, elbow and tee connections and around straight couplings connecting abutting pipe segments generate high shear and tensile stresses and strains that often exceed the elastic limits of the pipes or the pipes connections leading to multiple ruptures in the network of water pipes at various points thereby partially or completely shutting down water supply to residential home and/or businesses over the area serviced by the water network.

Functioning water systems are a cornerstone of urban human communities, to bring in the clean water on demand for drinking, washing and sanitary needs, and in turn remove the used water from drains, waste, and storm water sources. If the water network system is suddenly rendered partially or totally non-functional by an earthquake or a landslide, critical disruption of the community and public health danger may result. In catastrophic events such as earthquakes, water supply to the population in the aftermath of the event is crucial and must be restored rapidly. However, locating and replacing ruptured or broken pipe segments and pipe connections through a vast network is time consuming and requires heavy machinery for excavation, removal of damage pipes and connections and installation of new pipes and connections.

Newer networks of underground water conduits built in high risk areas are designed to withstand higher shear and tensile stresses and strains such as those generated by earthquakes and landslides. However, the vast majority of underground water networks were built many decades ago based on lower standards and cannot withstand the high shear and tensile stresses and strains generated by earthquakes and landslides.

Replacing older networks of underground water conduits with new ones more adapted to withstand the high shear and tensile stresses and strains generated by earthquakes and landslides is unrealistic because of the sheer magnitude of the work that would be involved. However, reinforcing existing water networks without the need to excavate represents a feasible alternative especially in higher risk areas.

Therefore, there is a need for a method of reinforcing underground water conduits to resist earthquakes and landslides and to a reinforcement structural device adapted for insertion into underground water conduits without having to excavate.

SUMMARY OF THE INVENTION

It is an object of the present invention to ameliorate at least some of the inconveniences present in the prior art.

In one aspect, the invention provides a structural liner for reinforcing a network of underground water conduits, the structural liner comprising a seamless woven tubular sheath impregnated with a hardening resin; the seamless woven tubular sheath comprising longitudinal fiber warp yarn having a linear mass density of at least 7,000 deniers providing tensile strength along a longitudinal axis of the woven tubular sheath and circumferential fiber filling yarn having a linear mass density of at least 10,000 deniers oriented substantially perpendicular to the longitudinal warp yarn providing tensile strength and stiffness around the circumference of the woven tubular sheath.

In an additional aspect, the warp yarn and filling yarn have a twists per unit length in the range of 0.3/inch to 3/inch.

In an additional aspect, the seamless woven tubular sheath further comprises longitudinal fiber warp yarns extending along a first axial direction and curving to extend along a second axial direction thereby forming three branches of a T-shaped woven sheath specifically adapted to reinforce a tee connection coupling of the network of underground water conduits.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
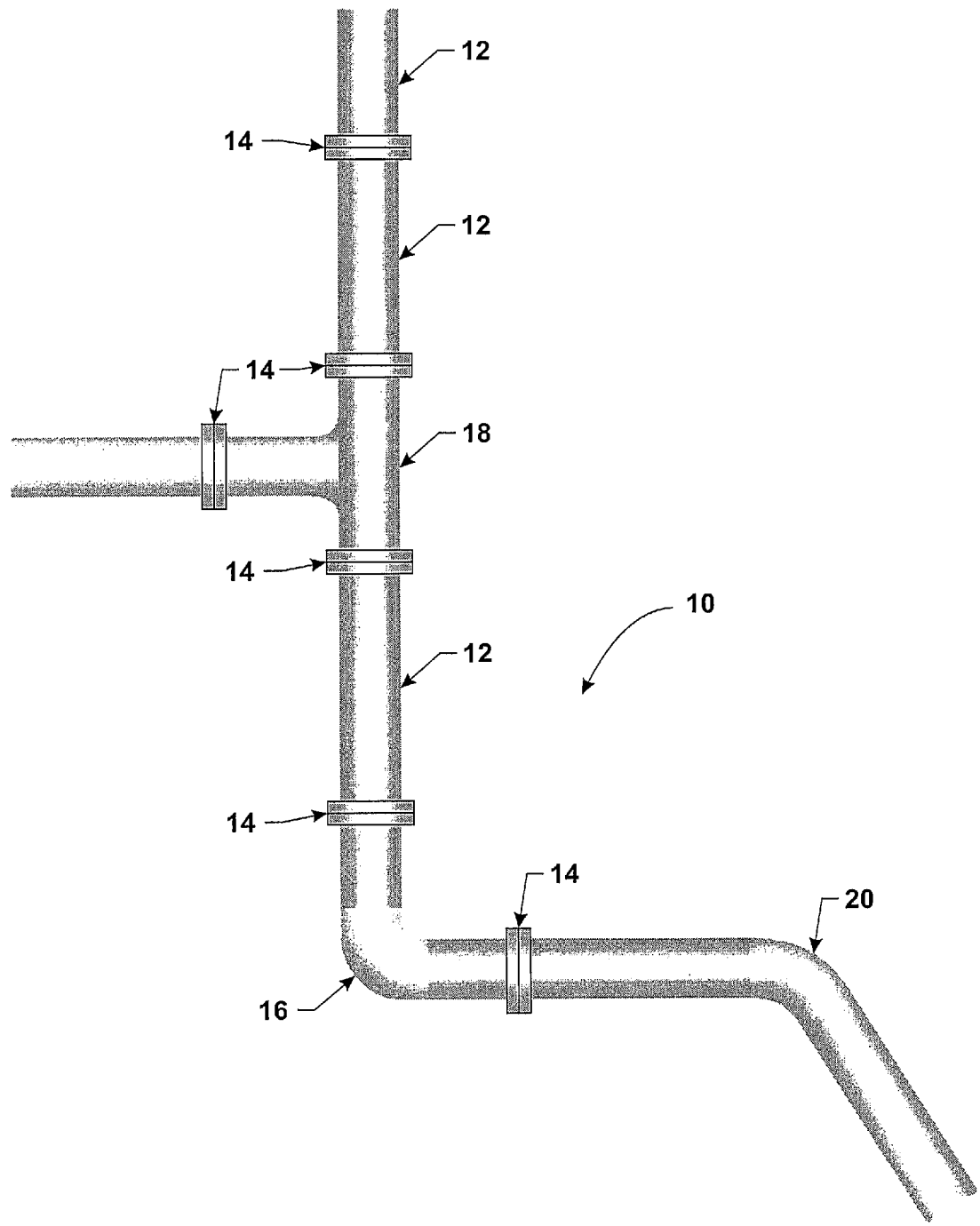
FIG. 1 is a schematic top plan view of a typical older network of underground water conduits.

FIG. 1 is a schematic illustration of a portion of a typical older network of underground water conduits 10 comprising a series of straight segments of pipes 12 joined together with couplings 14, elbows 16, tee connections 18 and bends 20. Typical underground conduits for potable water have diameters ranging from 4 inches to 24 inches and the more common diameters range from 6 inches to 12 inches. Underground conduits for potable water have multiple small diameters service entrances ranging from ½ inch to 2 inches typically in diameter connected to residences or businesses supplying the end users with potable water.

In the event of an earthquake or a landslide, the ground motion will exert extreme forces on the water pipe network and the direction of the ground flow will generate axial pullout forces and bending moments around the coupling 14, elbow 16, tee connection 18 and bend 20 due to their specific orientations relative to the direction of the ground flow thereby generating high shear and tensile stresses and strains that, at some connections, will exceed the elastic limits of the pipe connections leading to ruptures in the network of water pipes at various points.

Figure 2:
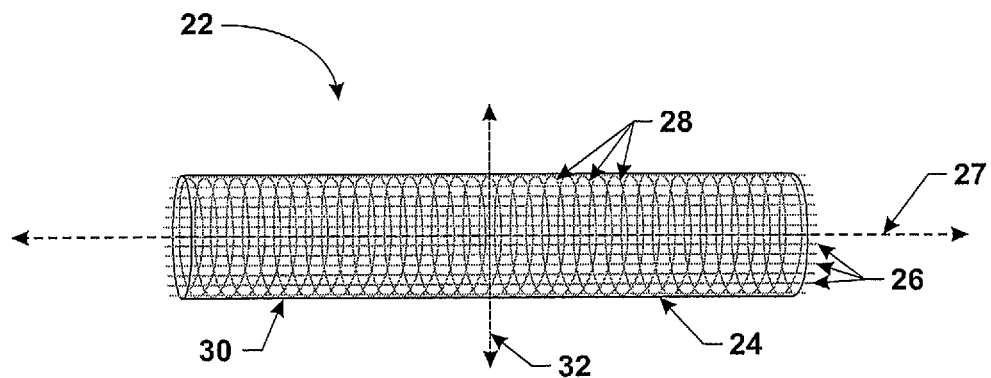
FIG. 2 is a schematic view of a structural liner in accordance with one embodiment of the invention.

As shown in FIG. 2, in order to reinforce the network of underground conduits 10 particularly at the couplings 14, a structural liner 22 consisting of a seamless woven tubular sheath 24 impregnated with a hardening resin was devised which is adapted for insertion into the network of underground water conduits 10 without the need to excavate because the structural liner 22 remains flexible until its impregnated resin is hardened after it has been installed inside the network of underground conduits 10. The seamless woven tubular sheath 24 consists of continuous longitudinal fiber warp yarns 26 providing tensile strength along the longitudinal axis 27 of the woven tubular sheath 24 and circumferential fiber filling yarn 28 oriented approximately 90° relative to longitudinal warp yarn 26 providing tensile strength around the wall 30 of the woven tubular sheath 24 along the perpendicular axis 32.

The warp yarn 26 and the filling yarn 28 are preferably made of heavy yarns. For woven tubular sheath of six (6) inches in diameter, the warp yarn 26 has a linear mass density of at least 7,000 deniers and the circumferential filling yarn has a linear mass density of at least 10,000 deniers. For woven tubular sheath of eight (8) inches in diameter, the warp yarn 26 has a linear mass density of at least 9,000 deniers and the circumferential filling yarn has a linear mass density of at least 20,000 deniers. For woven tubular sheath of twelve (12) inches in diameter, the warp yarn 26 has a linear mass density of at least 20,000 deniers and the circumferential filling yarn has a linear mass density of at least 30,000 deniers and preferably 40,000 deniers. Heavy yarns having high linear mass density have high tenacity and tensile modulus, and moderate to high tensile elongation which are essential characteristics for reinforcing underground water conduits to prevent ruptures in the event of an earthquake. Furthermore, preferred heavy yarns have fewer twists per unit length than lower linear mass density yarns which mechanically improves their wettability. A high number of twists per unit length provide a physical barrier against the impregnation of the yarn by the hardening resin because there is less space for the hardening resin to penetrate the yarn. Heavy yarns with twist per unit length in the range of 0.3/inch to 3/inch are preferred for the structural liner 22 and more preferably in the range of 1/inch to 2.5/inch. An improved wettability of the longitudinal fiber warp yarns 26 and of the circumferential fiber filling yarn 28 results in a better impregnation of the woven tubular sheath 24 by the hardening resin and increases the overall strength of the fiber-resin matrix of the structural liner 22. Heavy yarns therefore have the added advantage of being able to absorb a large quantity of hardening resin as the resin penetrates easily through the large diameter filaments and the low twist per unit length of the bulky yarn. The structural liner 22 is therefore more densely impregnated with hardening resin with fewer voids than lower linear mass density yarns thereby generating a more solid structure when the resin is hardened.

The hardening resin may be curable resin such as an epoxy resin, an unsaturated polyester resin, a vinyl ester resin, or a urethane based resin, or a thermoplastic resin such as a polyolefin, a polyethylene, a polyethylene terephthalate (PET) or technical resin such as NYLON, etc.

The fiber yarn may be made of polyester fibers, fiber glass, carbon fibers, aramid fibers, natural fibers such as cellulosic fibers, like flax or hemp fibers, oriented polyethylene fibers, polyamide fibers or polypropylene fibers.

Figure 3:
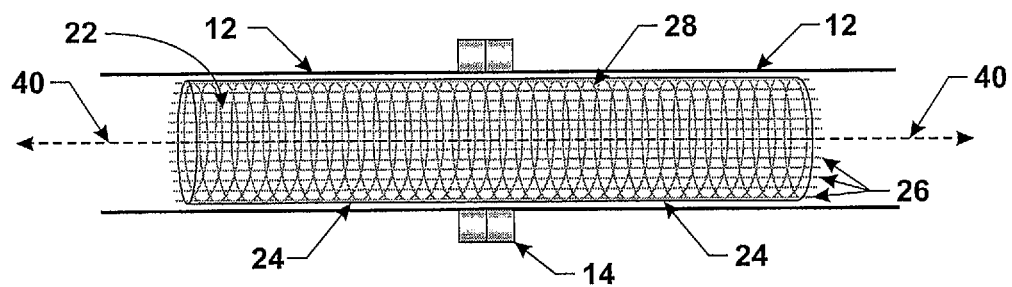
FIG. 3 is a schematic view of the structural liner of FIG. 2 positioned inside two adjacent pipe segments connected together.

Once in place inside the network of underground conduits 10 and more specifically inside the couplings 14 connecting two adjacent pipe segments 12, the hardening resin is cured and the structural liner adheres to the inner wall of the pipe segments 12. The longitudinal warp yarn 26 of the woven tubular sheath 24 provides added tensile strength to the couplings 14 along the longitudinal axis 40 of the two adjacent pipe segments 12 as shown in FIG. 3. This added tensile strength along the longitudinal axis 40 at the coupling 14 of the two adjacent pipe segments 12 dramatically increases the deformation limit or damage tolerance of the coupling 14 and of the pipe segments 12 thereby enabling the coupling 14 to resist the axial pullout forces, the shear forces and the bending moments generated during an earthquake or a landslide. The force of the adhesion of the hardening resin to the inner wall of the pipe segments also provides additional strength to resist the axial pullout forces, the shear forces and the bending moments generated during an earthquake or a landslide.

Figure 4:
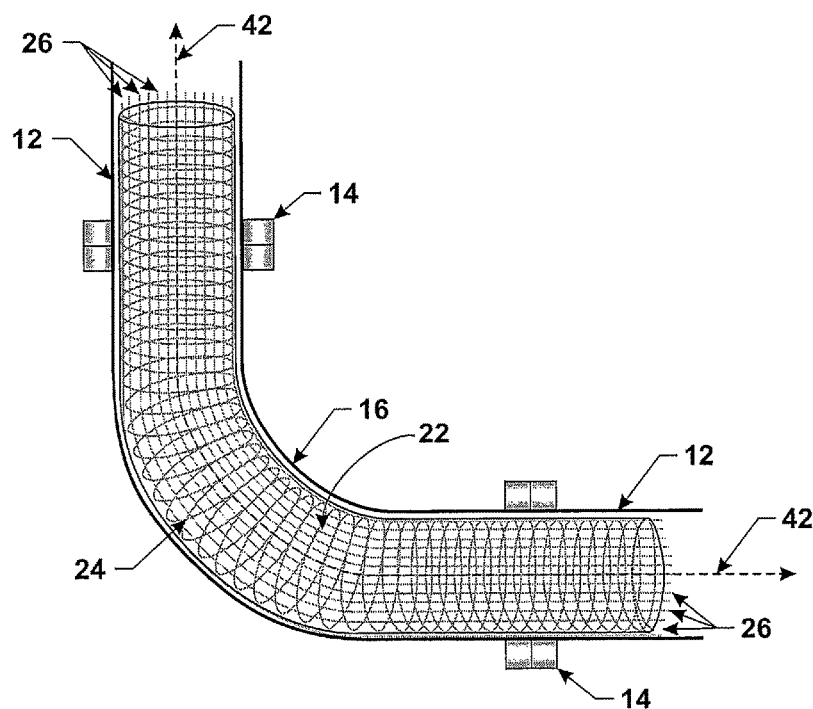
FIG. 4 is a schematic view of the structural liner of FIG. 2 positioned inside an elbow connecting two pipe segments.

FIG. 4 illustrates a structural liner 22 positioned inside an elbow 16. The woven tubular sheath 24 being flexible prior to curing the resin impregnated therein is adapted to conform to the curvature of the elbow. Once cured in place, the longitudinal warp yarn 26 of the woven tubular sheath 24 provides added tensile strength to the couplings 14 connecting the elbow 16 to the pipe segments 12 along the axial direction 42 and provides added tensile strength to the body of the elbow 16. When the elbow 16 and its couplings 14 are subjected to axial pullout forces, shear forces and bending moments during an earthquake or a landslide, the longitudinal warp yarn 26 of the woven tubular sheath 24 increases the resistance of the assembly at the points of maximum strain which enables the assembly of elbow 16 and pipe segments 12 to remain together even if the elbow is subject to deformation.

Figure 5:
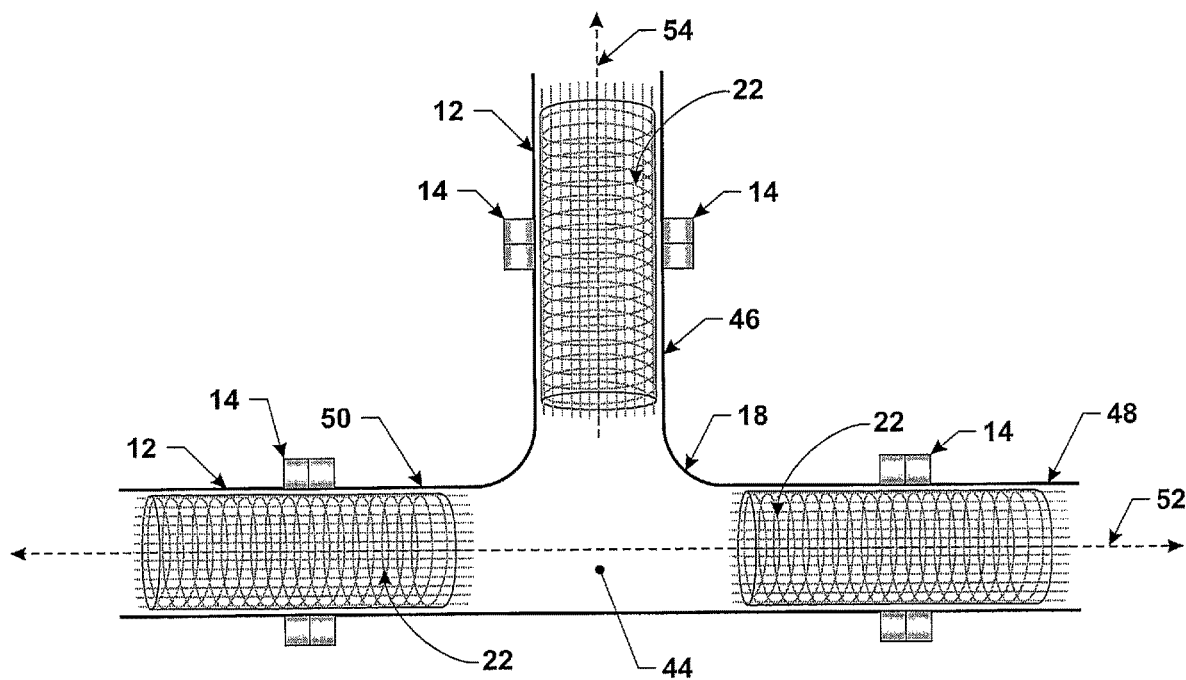
FIG. 5 is a schematic view of the structural liner of FIG. 2 positioned inside a tee connection connected to three pipe segments.

FIG. 5 illustrates a tee connections 18 connected to three pipe segments 12. Due to the particular configuration of a tee connection, the structural liner 22 cannot reinforce the central portion 44 of the tee connection 18 without blocking one of the branches 46, 48 or 50. However, it is possible to reinforce the couplings 14 connecting the branches 46, 48 and 50 to the pipe segments 12 by inserting structural liners 22 from the pipe segments 12 and ending each structural liner 22 at the junctions of the branches 46, 48 or 50 to the central portion 44 of the tee connection 18 as illustrated. In this manner, the longitudinal warp yarn 26 of the woven tubular sheath 24 of the structural liners 22 provides added tensile strength at least to the couplings 14 connecting the tee connection 18 to the pipe segments 12 along the axial directions 52 and 54 where the axial pullout forces, shear forces and bending moments are highest during an earthquake or a landslide.

Figure 5A:
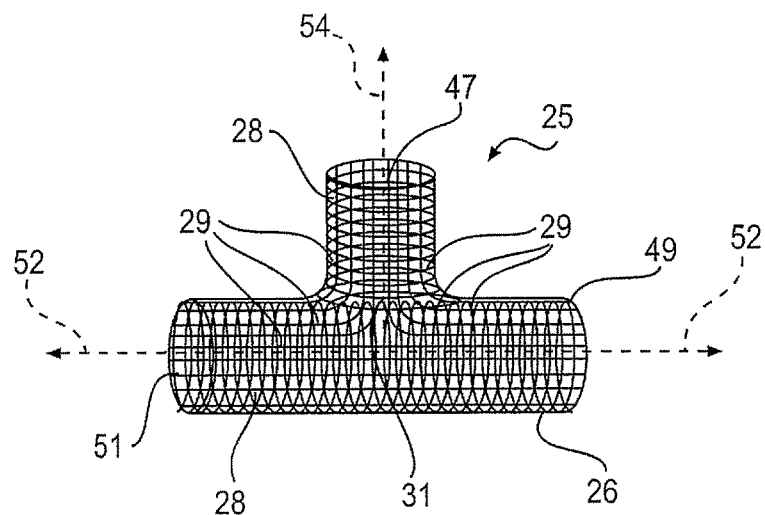
FIG. 5a is a schematic view of a T-shaped woven sheath in accordance with another embodiment of the invention.

FIG. 5a illustrates a T-shaped woven sheath 25 specifically adapted to reinforce the central portion 44 of the tee connection 18. The woven sheath 25 comprises longitudinal fiber warp yarns 26 extending along the axial directions 52 and longitudinal fiber warp yarns 29 also extending along the axial directions 52 and curving at the central portion 31 to extend along the axial direction 54 thereby forming the branches 47, 49 and 51 of the T-shaped woven sheath 25. The longitudinal fiber warp yarns 26 and 29 are held together with circumferential fiber filling yarn 28 oriented nearly 90° relative to longitudinal warp yarns 26 and 29.

In operation, the T-shaped woven sheath 25 is impregnated with the hardening resin and is inserted into the central portion 44 of the tee connection 18 prior to the insertion of the structural liners 22 into the branches 46, 48 and 50. The T-shaped woven sheath 25 is soft and malleable and can be positioned in the central portion 44 of the tee connection 18. Thereafter, a tubular shaping device is introduced into the branches 47, 49 and 51 of the T-shaped woven sheath 25 that push the branches 47, 49 and 51 of T-shaped woven sheath 25 outwardly against the inner walls of the branches 46, 48 and 50 of the tee connection 18 such that the branches 47, 49 and 51 temporarily adhere to the inner walls of the branches 46, 48 and 50 of the tee connection 18 through the uncured resin in order to initially shape the T-shaped woven sheath 25 without curing its resin. Once the T-shaped woven sheath 25 is properly shaped, the structural liners 22 are inserted into the pipe segments 12 and extend into the branches 47, 49 and 51 of the T-shaped woven sheath 25 such that the branches 47, 49 and 51 of the T-shaped woven sheath 25 overlap the ends of each structural liner 22 at the junctions of the branches 46, 48 or 50 to the central portion 44 of the tee connection 18 as illustrated in FIG. 5a.

Figure 6:
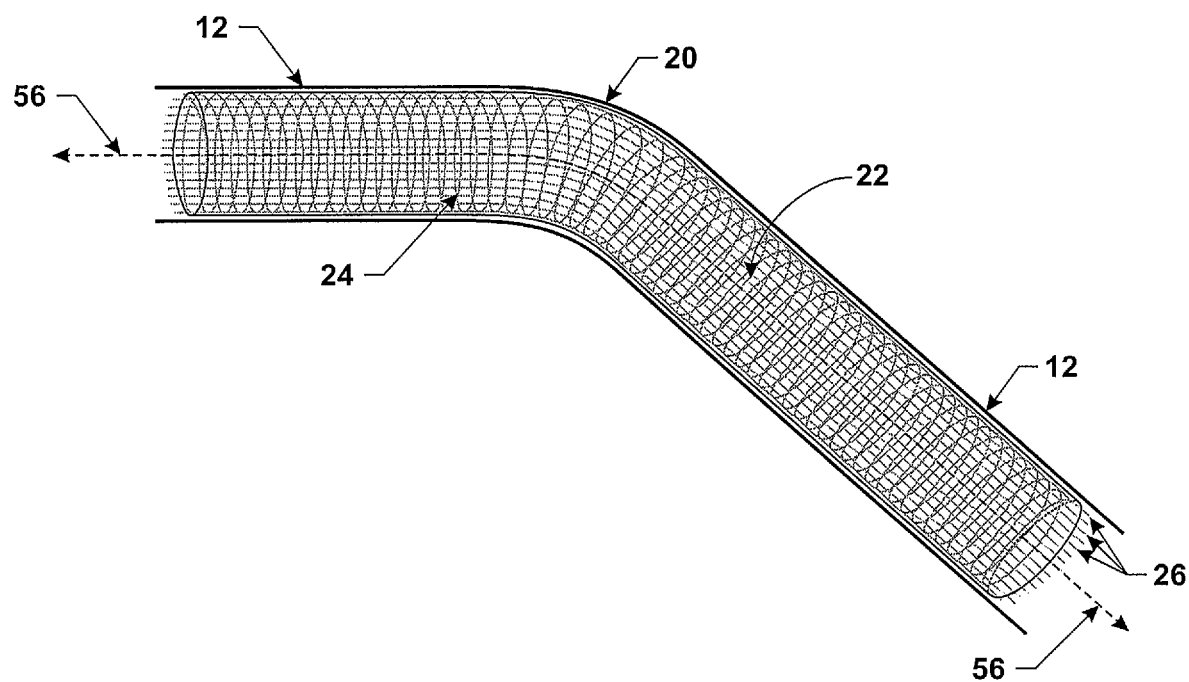
FIG. 6 is a schematic view of the structural liner of FIG. 2 positioned inside a bend of an older network of underground water conduits.

FIG. 6 illustrates a structural liner 22 positioned inside a bend 20. As previously described relative to structural liner 22 positioned inside an elbow 16, the woven tubular sheath 24 being flexible prior to curing the resin impregnated therein is adapted to conform to the curvature of the bend 20. Once cured in place, the longitudinal warp yarn 26 of the woven tubular sheath 24 provides added tensile strength to the bend 20 and to the pipe segments 12 extending from the bend along the axial direction 56. When the bend 20 is subjected to axial pullout forces, shear forces and bending moments during an earthquake or a landslide, the longitudinal warp yarn 26 of the woven tubular sheath 24 increases the resistance of the bend 20 at the points of maximum strain enabling the bend 20 to resist the high tensile strains and stresses generated even if it is subjected to partial deformation.

Figure 7:
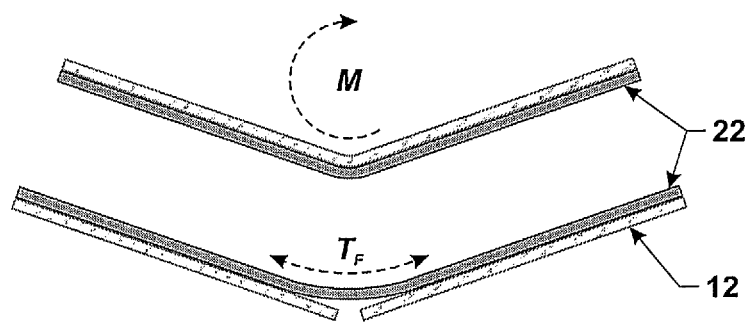
FIG. 7 is a schematic cross-sectional view of a pipe segment reinforced with a structural liner subjected to a bending moment.

With reference to FIG. 7, which illustrates a pipe segment 12 subjected to a bending moment M, the pipe segment 12 has bent and has fractured and separated at the bend 75 under the localised tension force $T_f$. However, the structural liner 22 inside the pipe segment 12 has remained intact under the bending moment M due to its flexibility and its ability to sustain deformation. The structural liner 22 has stretched at the fracture point and maintained the integrity of the fractured pipe segment 12. The result is that in the aftermath of an earthquake or a landslide, the underground water conduit remains operational.

Figure 8:
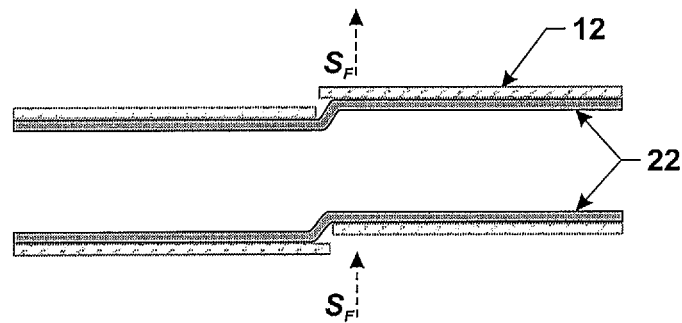
FIG. 8 is a schematic cross-sectional view of a pipe segment reinforced with a structural liner subjected to a shear force.

With reference to FIG. 8, which illustrates a pipe segment 12 subjected to a shear force $S_f$ perpendicular to the longitudinal axis of the pipe segment 12, the pipe segment 12 has fractured and separated under the shear force $S_f$. However, as can be seen, the structural liner 22 inside the pipe segment 12 has remained intact under shear force $S_f$ due to its flexibility and its ability to sustain deformation. The structural liner 22 has bent at the fracture point and conformed to the displacement of the fractured pipe segment 12. The result is that in the aftermath of an earthquake or a landslide, the underground water conduit remains operational.

Figure 9:
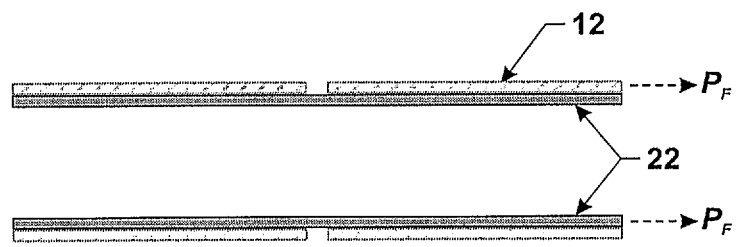
FIG. 9 is a schematic cross-sectional view of a pipe segment reinforced with a structural liner subjected to an axial pullout force.

With reference to FIG. 9, which illustrates a pipe segment 12 subjected to subjected to an axial pullout force $P_f$ along its longitudinal axis, the pipe segment 12 has fractured and separated under the pullout force $P_f$. However, as can be seen, the structural liner 22 inside the pipe segment 12 has remained intact under pullout force $P_f$ due to its flexibility and its ability to sustain deformation. The structural liner 22 has stretched at the fracture point and maintained the integrity of the fractured pipe segment 12. The result is that in the aftermath of an earthquake or a landslide, the underground water conduit remains operational.

Figure 10:
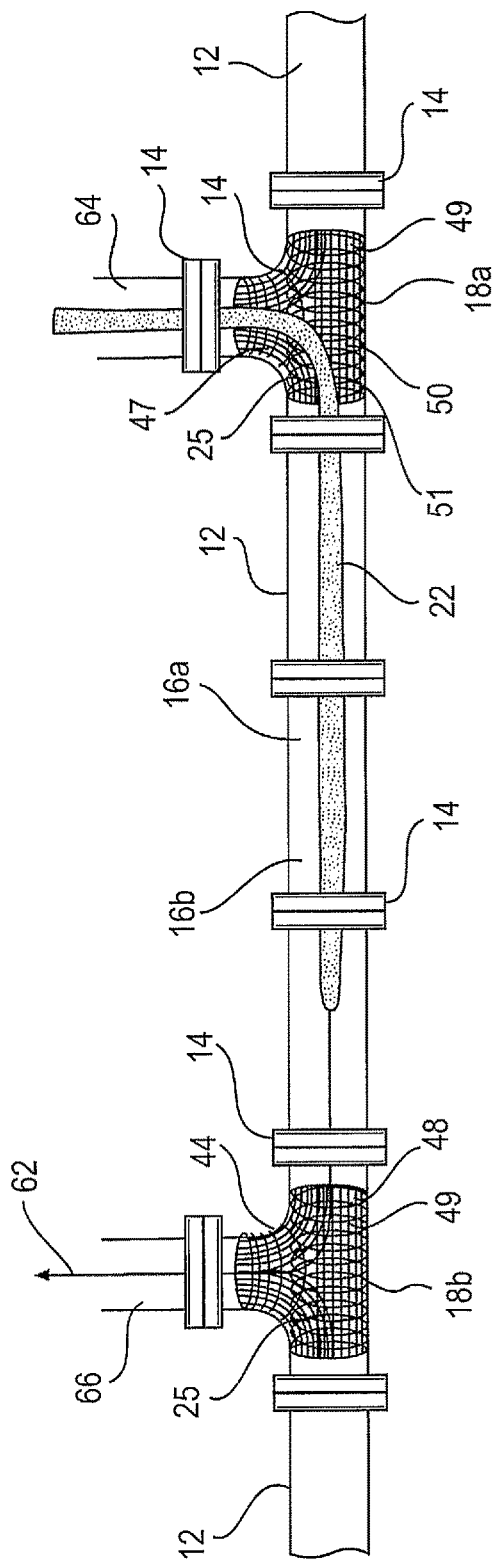
FIG. 10 is a schematic side elevational view of a portion of a network of underground water conduits.
Figure 11:
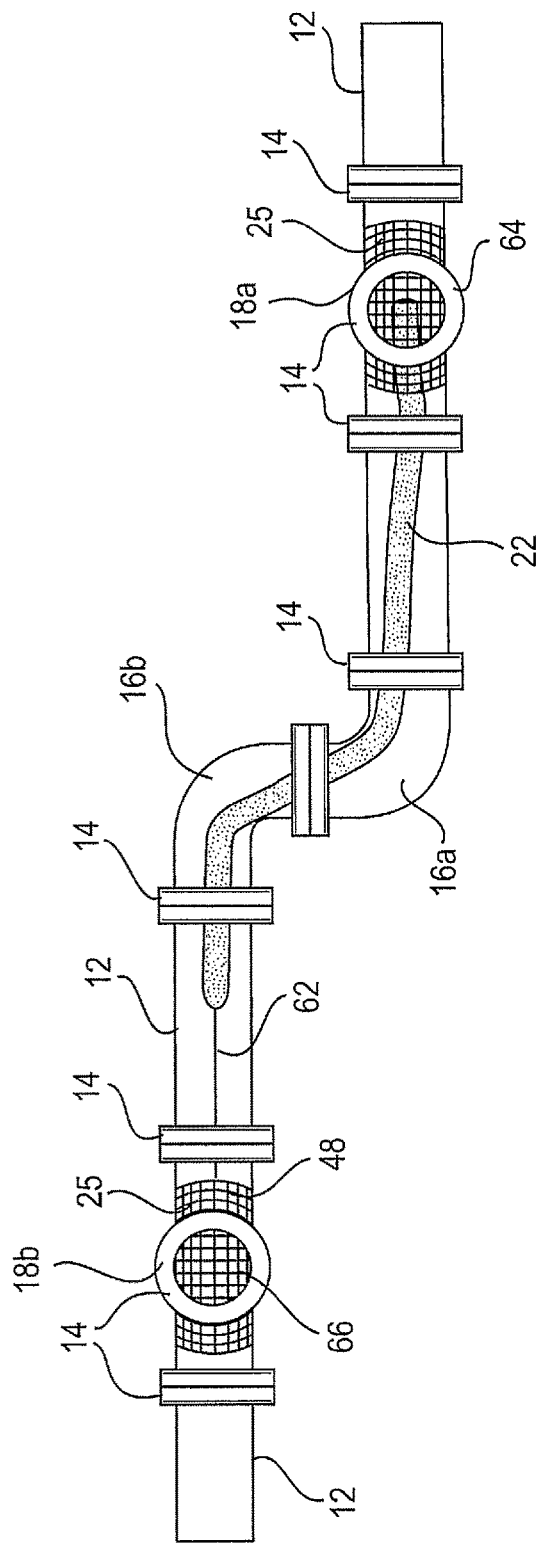
FIG. 11 is a schematic top plan view of the network of underground water conduits illustrated in FIG. 10.
Figure 12:
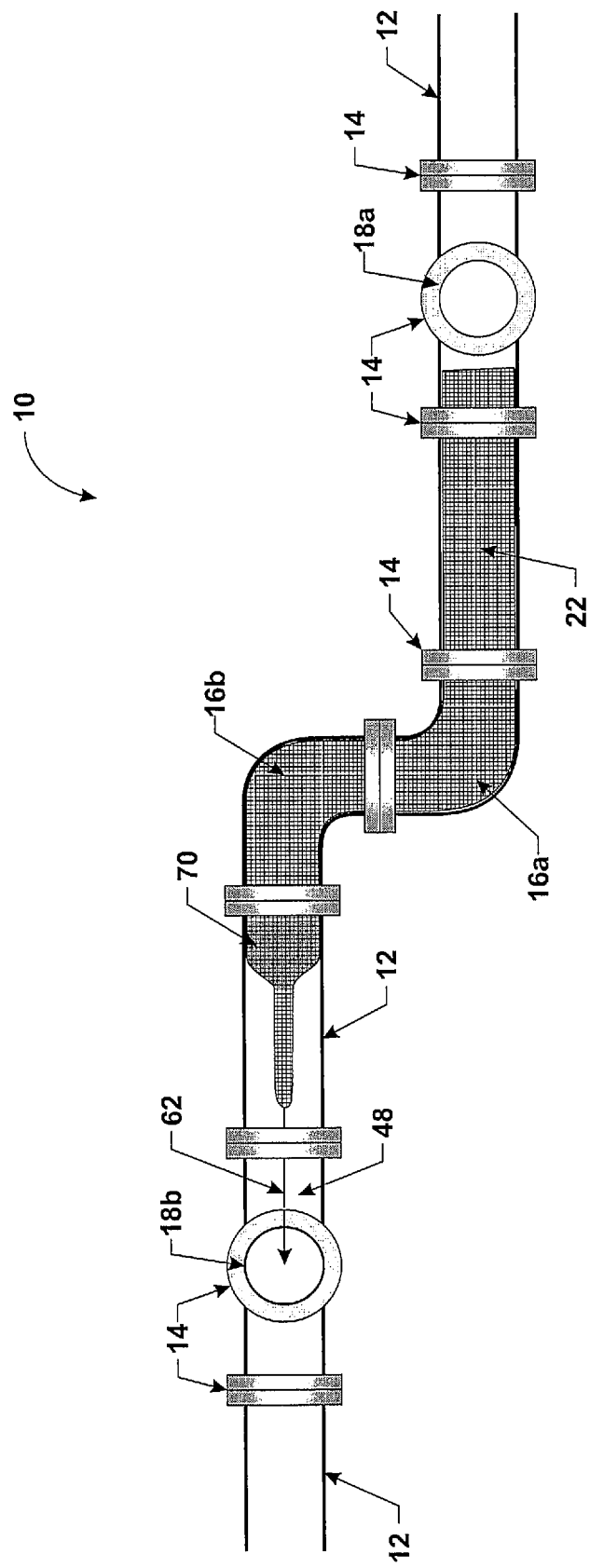
FIG. 12 is a schematic top plan view of the network of underground water conduits illustrated in FIGS. 10 and 11 with the structural liner partially installed therein.

With reference to FIG. 10, which illustrates a side view of a portion of a typical older network of underground water conduits 10 comprising a series of straight segments of pipes 12 joined together with couplings 14, elbows 16, tee connections 18 and FIG. 11 which is a plan view of the same portion of the network of underground water conduits 10 illustrated in FIG. 10, a winch cable 62 is initially inserted into the network of underground water conduits 10 entering through first pipe segment 64 connected above ground to a fire hydrant for example and exiting through a second pipe segment 66 connected above ground to another fire hydrant for example. The structural liner 22 comprising the woven tubular sheath 24 impregnated with resin is then attached to the winch cable 62 and pulled into the network 10 by a winching device (not shown) attached to the cable 62. The flexibility of the structural device 22 allows it to be pulled through the first tee connection 18*a* and through the first and second elbows 16*a* and 16*b* as illustrated. The structural liner 22 is pulled through the whole length of the portion of the network of underground water conduits 10 in this manner.

Figure 5B:
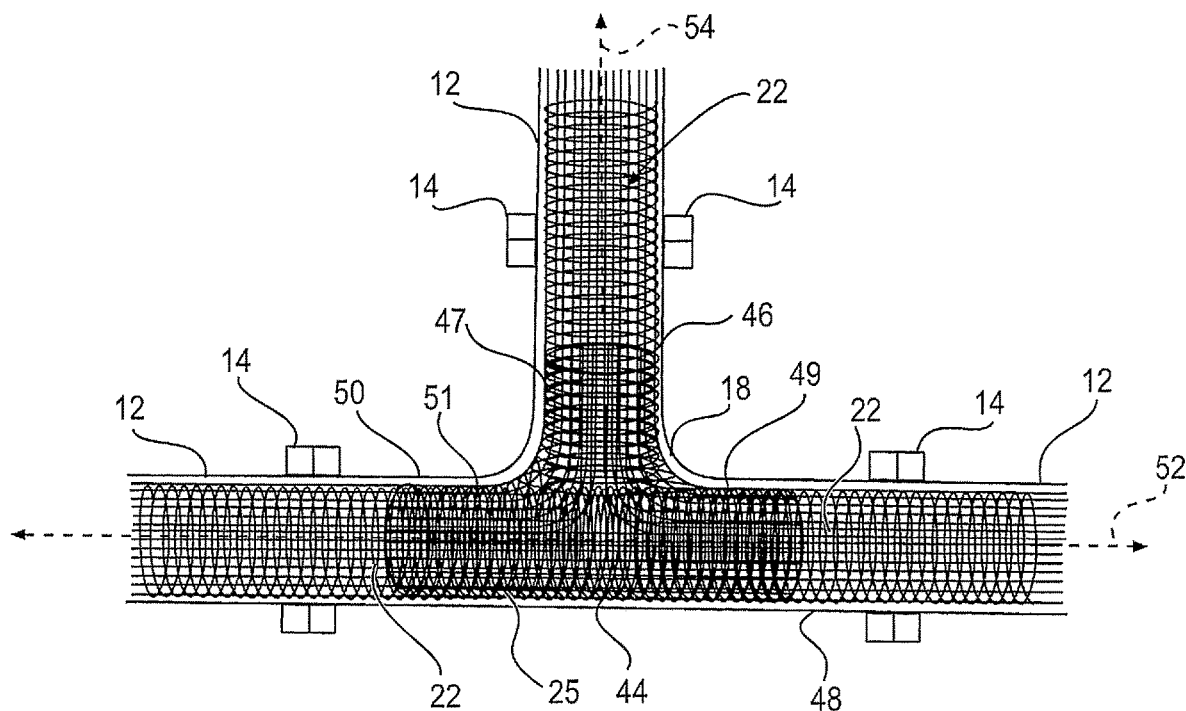
FIG. 5b is a schematic view of the T-shaped woven sheath of FIG. 5a positioned inside a tee connection connected to three pipe segments.

As previously mentioned with reference to a tee connection 18, the structural liner 22 cannot be pulled into the central portion 44 of the tee connection 18*b* without blocking one of its branches. The front end of the structural liner 22 is therefore pulled up to the junction of the branch 48 and the central portion 44 of the tee connection 18*b* and released. Similarly, the length of the structural liner 22 is calculated such that its rear end is located at the junction of the branch 50 and the central portion 44 of the tee connection 18*a*. A T-shaped woven sheath 25 as described with reference to FIGS. 5*a* and 5*b* is used in order to reinforce the central portion 44 of the tee connections 18*a* and 18*b*. As shown in FIGS. 10 and 11, a T-shaped woven sheath 25 was first inserted in the tee connections 18*a* and 18*b* and shaped with a tubular shaping device such that the branches 47, 49 and 51 of the T-shaped woven sheath 25 temporarily adhere to the inner walls of the branches 46, 48 and 50 of the tee connections 18*a* and 18*b* prior to the insertion of the structural liner 22. Thereafter, the structural liner 22 of a specific length corresponding to the distance between the junction of branch 48 and the central portion 44 of the tee connection 18*b* and the junction of the branch 50 and the central portion 44 of the tee connection 18*a* is inserted through the T-shaped woven sheath 25 and pulled through the network of underground water conduits 10 such that the branches of the T-shaped woven sheath 25 overlap the ends of the structural liner 22 prior to curing.

FIGS. 10 and 11 illustrate and describe a pull-in-place process of installing the structural liner 22 into network of underground water conduits 10. However, an inversion process may also be used in which the resin impregnated structural liner 22 is inverted and pushed inside the water conduits 10 by applying hydrostatic or air pressure against the internal walls of the structural liner 22 such that the structural liner 22 reverses and deploys right side up against the walls of the water conduits 10.

After the insertion of the structural liner 22 into the portion of the network of underground water conduits 10, the woven tubular sheath 24 impregnated with resin is resting flat on the bottom of the water conduits 10 and must be shaped to take its final tubular form in order to rest against the inner walls of the pipe segments 12 and couplings 14, elbows 16 and the couplings of the branches 48 and 50 of the tee connections 18*a* and 18*b*. The shaping of the structural liner 22 against the inner walls of the network of underground water conduits 10 is accomplished by passing a shaping member or pig 70 through a first T-shaped woven sheath 25 which is preferably pushed along the structural liner 22 by pressurized water. The pig 70 pushes the woven tubular sheath 24 outwardly against the inner walls of the pipe segments 12 and couplings 14, elbows 16 and the couplings of the branches 48 and 50 of the tee connections 18*a* and 18*b* and assumes its final tubular shape.

After the shaping of the structural liner 22 against the inner walls of the network of underground water conduits 10, the curable resin of the structural liner 22 and of the T-shaped woven sheaths 25 is cured in place. The curing of the resin is preferably achieved by the effect of the passage of hot pressurised water through the structural liner 22 and the T-shaped woven sheaths 25. The transfer of the heat from the water to the curable resin allows the cross-linking reaction to take place, and thus the curing of the resin. The curing of the resin maintains the woven tubular sheath 24 in its tubular shape and provides mechanical integrity and rigidity to the structural liner 22 and the T-shaped woven sheaths 25. Furthermore, the curing of the resin permanently bonds the woven tubular sheath 24 and the T-shaped woven sheaths 25 to the inner walls of the network of underground water conduits 10.

If a structural liner 22 pre-impregnated with a thermoplastic resin or comprising a thermoplastic resin in the form of comingled fibres is used, the thermoplastic is consolidated through heating and pressurizing for a given period of time by means of pressurized hot water, steam or hot air or other means to bring the thermoplastic to its consolidation point i.e. slightly above its melting temperature, in order for it to melt, wet-out the fibres of the structural liner, and solidify upon cooling, resulting in a structural thermoplastic composite liner.

Once installed and cured, the structural liner 22 and the T-shaped woven sheath 25 reinforce the entire network of underground water conduits 10 and more specifically around the couplings 14, elbows 16, tee connections 18 and bends 20 which are more susceptible to breakage under the axial pullout forces, shear forces and bending moments generated by earthquakes and landslides.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A structural liner for reinforcing a network of underground water conduits, the structural liner comprising a seamless woven tubular sheath impregnated with a hardening resin which is cured in place inside the water conduits; the seamless woven tubular sheath comprising longitudinal fiber warp yarn having a linear mass density of at least 7,000 deniers providing tensile strength along a longitudinal axis of the woven tubular sheath and circumferential fiber filling yarn having a linear mass density of at least 10,000 deniers oriented substantially perpendicular to the longitudinal warp yarn providing tensile strength and stiffness around the circumference of the woven tubular sheath to resist external shear forces and bending moments caused by an earthquake or a landslide, wherein the warp yarn and filling yarn have a twists per unit length in the range of 0.3/inch to 3/inch.

2. A structural liner as defined in claim 1, wherein the warp yarn has a linear mass density of at least 9,000 deniers and filling yarn has a linear mass density of at least 20,000 deniers.

3. A structural liner as defined in claim 1, wherein the warp yarn has a linear mass density of at least 20,000 deniers and filling yarn has a linear mass density of at least 30,000 deniers.

4. A structural liner as defined in claim 3, wherein filling yarn has a linear mass density of between 30,000 and 40,000 deniers.

5. A structural liner as defined in claim 1, wherein the warp yarn and filling yarn have a twists per unit length in the range of 1/inch to 2.5/inch.

6. A structural liner as defined in claim 1, wherein the fiber of the longitudinal fiber warp yarn and of the circumferential fiber filling yarn is selected from the group consisting of polyester fibers, glass fibers, basalt fibers, carbon fibers, aramid fibers, natural fibers, oriented polyethylene fibers, ultra-high molecular weight polyethylene fibers, polyamide fibers, including aramid fibers, and polypropylene fibers.

7. A structural liner as defined in claim 1, wherein the hardening resin is selected from the group of curable resin such as epoxy resin, unsaturated polyester resin, vinyl ester resin, and urethane based resin or a thermoplastic resin such as a polyolefin, a polyethylene, a polypropylene, a polyethylene terephthalate (PET) or technical resin.

8. A structural liner for reinforcing a network of underground water conduits, the structural liner comprising a seamless woven tubular sheath impregnated with a hardening resin which is cured in place inside the water conduits; the seamless woven tubular sheath comprising longitudinal fiber warp yarn having a linear mass density of at least 7,000 deniers providing tensile strength along a longitudinal axis of the woven tubular sheath and circumferential fiber filling yarn having a linear mass density of at least 10,000 deniers oriented substantially perpendicular to the longitudinal warp yarn providing tensile strength and stiffness around the circumference of the woven tubular sheath to resist external shear forces and bending moments caused by ground motion, wherein the warp yarn and filling yarn have a twists per unit length in the range of 0.3/inch to 3/inch.

* * * * *